United States Patent [19]
Neumeier et al.

[11] Patent Number: 5,784,300
[45] Date of Patent: Jul. 21, 1998

[54] METHODS, APPARATUS AND SYSTEMS FOR REAL TIME IDENTIFICATION AND CONTROL OF MODES OF OSCILLATION

[75] Inventors: Yedidia Neumeier; Ben T. Zinn, both of Atlanta, Ga.

[73] Assignee: Georgia Tech Research Corporation, Atlanta, Ga.

[21] Appl. No.: 854,444

[22] Filed: May 12, 1997

Related U.S. Application Data

[63] Continuation of Ser. No. 405,909, Mar. 17, 1995, Pat. No. 5,719,791.

[51] Int. Cl.$^6$ .................................................. G06F 17/10
[52] U.S. Cl. .................. 364/574; 364/724.19; 381/71.1; 381/71.2; 381/71.12; 381/73.1
[58] Field of Search ................... 364/574, 524.19, 364/724.011; 381/71.1, 71.2, 71.3, 71.11, 71.12, 71.14, 73.1

[56] References Cited

U.S. PATENT DOCUMENTS

| | | | |
|---|---|---|---|
| 4,473,348 | 9/1984 | Tikhonovich et al. | 431/1 |
| 4,490,841 | 12/1984 | Chaplin et al. | 381/71 |
| 4,557,106 | 12/1985 | Williams et al. | 60/39 |
| 4,599,567 | 7/1986 | Goupillaud et al. | 327/105 X |
| 4,600,863 | 7/1986 | Chaplin et al. | 310/51 X |
| 4,699,588 | 10/1987 | Zinn et al. | 431/114 X |
| 4,963,804 | 10/1990 | Geiger | 318/460 |
| 5,176,513 | 1/1993 | Zinn et al. | 432/58 |
| 5,233,540 | 8/1993 | Andersson et al. | 364/574 X |
| 5,278,777 | 1/1994 | Cummins | 364/574 |
| 5,359,662 | 10/1994 | Yuan et al. | 381/71.14 |
| 5,719,791 | 2/1998 | Neumeier et al. | 364/574 |
| 5,727,071 | 3/1998 | Suzuki | 381/71.8 |

OTHER PUBLICATIONS

Langhorne et al.; "Practical Active Control System for Combustion Oscillations"; J. Propulsion, vol. 6 No. 3, pp. 324–333.
Billoud et al; "Adaptive Active Control of Instabilities"; Combust. Sci. and Tech., vol. 81, pp. 257–283.
Fung et al; "Active Control of Nonlinear Pressure Oscillations in Combustion Chambers"; Journal of Propulsion and Power, vol. 8, No. 6, pp. 1282–1289.
Zinn et al.; "Application of the Garlerkin Method in the Solution of Non–linear Axial Combustion Instability Problems in Liquid Rockets"; Combustion Science and Technology, vol. 4, pp. 269–278.

Primary Examiner—Edward R. Cosimano
Attorney, Agent, or Firm—Thomas, Kayden, Horstemeyer & Risley LLP

[57] ABSTRACT

A system for real time identification of modes of oscillation includes a sensor, an observer, a controller and an actuator. The sensor senses a controlled system such as a combustor, and generates a signal indicative of the modes of oscillation in the controlled system. For example, these modes of oscillation can be combustion instabilities. The observer receives the signal from the sensor, and uses the signal to determine modal functions and frequencies of the modes of interest with a pair of integrals with changing time limits. The controller receives the modal functions and frequency for each mode of interest from the observer, and effects a gain and phase shift for each mode. Based on the modal functions, the frequency, the gain and the phase shift, the controller generates and outputs a control signal, that is supplied to the actuator. The actuator controls the modes of oscillation of the controlled system, based on the control signal. The system of this invention can be used to damp or enhance oscillation modes of the controlled system, depending upon whether the oscillation modes are beneficial or detrimental to system performance.

11 Claims, 10 Drawing Sheets

METHODS, APPARATUS AND SYSTEMS FOR REAL TIME IDENTIFICATION AND CONTROL OF MODES OF OSCILLATION

This application is a continuation of application Ser. No. 08/405,909, filed on Mar. 17, 1995 now U.S. Pat. No. 5,719,791.

STATEMENT OF RIGHTS TO INVENTION MADE UNDER FEDERALLY SPONSORED RESEARCH AND DEVELOPMENT

This invention was developed pursuant to A.F.O.S.R. Grant No. F49620-93-1-0177. Accordingly, the U.S. Government has a paid-up license in this invention.

BACKGROUND OF THE INVENTION

1. Field of the Invention

The present invention relates primarily to the field of real time characterization and control of quasi periodic or periodic signals. Subjects in this field that can benefit from the invention include signal identification in a noisy background, coherent jamming identification and general real time signal identification. More specifically, the invention has been developed in conjunction with the field of vibration and oscillation control. This field covers subjects such as vibration damping in structures and machines, active noise reduction, control of compressor surge and stall, unsteady combustion control and unstable combustor control. The invention is particularly suitable for active control of combustion instabilities where it can rapidly identify and prevent the onset of detrimental combustion instabilities before they damage the system and/or prevent the system from attaining its objectives.

2. Description of the Related Art

Detrimental combustion instabilities, characterized by large amplitude oscillations of one or more natural acoustic modes of the combustor, often occur in propulsion systems, such as rocket motors, ramjets, air breathing jet engines, and gas turbines that are used for power generation and industrial combustion systems. A combustion instability occurs when energy supplied by the combustion process excites natural acoustic modes of the combustor via a feedback process between the acoustic and heat addition oscillations. The combustor oscillations that accompany the onset of combustion instability must be prevented or suppressed immediately after their appearance to avoid severely damaging or destroying the system, and destructive interference with the system's mission.

To date, passive approaches have been mainly used to prevent the occurrence and/or reduce the amplitude of combustion instability oscillations. A passive approach may involve a combination of one or more of the following: modification of the combustion process, changing the combustor geometry, and addition of damping elements to the system. Modifications of the combustion process, such as changing the fuel/oxidizer ratio or reactants feed system design, aim to reduce the amount of energy supplied by the combustion process to the oscillations. Changes to the combustor geometry, for example, by welding baffles to the injector face of a liquid propellant rocket motor, aim to limit the natural acoustic modes that can be excited in the combustor, and thus prevent excitation of unstable modes. Damping elements, such as Helmholtz resonators, are added to the system to increase its acoustic damping and prevent the excitation of potentially unstable modes or reduce their amplitudes to low levels. Unfortunately, due to lack of adequate understanding of the processes that control combustion instabilities, the implementation of passive control approaches generally requires lengthy and costly development programs, which often fail to attain their objectives. Moreover, these solutions are not universal and a different cure must be found whenever a new instability arises. Consequently, new approaches for controlling detrimental combustion instabilities are needed.

The shortcomings of passive control can be overcome by an active control approach. An active control system generally consists of a sensor, a controller and an actuator. A sensor such as a pressure transducer or a photo-multiplier is used to measure the combustor pressure or radical radiation, respectively. The sensor sends the measured signal to the controller where it is analyzed, modified and sent to the actuator whose task is to modify the operating conditions within the combustor in a manner that prevents the onset or causes rapid attenuation of the instability. The actuator may be a speaker that excites pressure oscillations within the combustor, an oscillating valve that periodically varies the air flow rate into the combustor or an injector that modulates the fuel and/or oxidizer flow rate into the combustor. In order to damp the instability, the actuator must introduce disturbances within the combustor that tend to attenuate the instability.

Current active control methods are based upon time domain approaches. Such time domain approaches typically assume that the instability consists of a single frequency oscillation. The measured signal is transmitted to a compensating network where it is provided with an appropriate amplification and phase shift. The modified signal is then sent to an actuator that excites a nearly pure harmonic oscillation within the combustor that is out of phase with the combustion instability oscillations. This approach was demonstrated in simple laboratory combustors, such as a Rijke burner, where single, low frequency longitudinal mode oscillations were excited. Langhorne, P. J., Dowling, A. P. and Hooper, N., *Journal of Propulsion and Power*, 6(3), 324, 1990. Such experiments represent a considerable simplification of what happens in practical combustors where complex oscillations consisting of several modes, each characterized by a different frequency and amplitude, are excited. Most importantly, the characteristics of the excited oscillations are generally not known in advance. To overcome this problem, Billoud, G., Galland, M. A., Huynh Huu, C. and Candel, S., *Combust. Sci. and Tech.*, 1992, Vol. 81, pp. 257–283, used an adaptive filter whose function was to assure that the utilized compensation network introduced proper amplification and phase shift as the frequency of the instability changed. Unfortunately, the implementation of such an adaptive process is inherently very slow and, thus, cannot rapidly suppress detrimental combustion instabilities.

Y. Fung and V. Yang, "Active Control of Nonlinear Pressure Oscillations in Combustion Chambers.", 27th AIAA/ASME/SAE/ASEE Joint Propulsion Conference, Sacremento, Calif., 1991, advocate the use of a more global time domain approach, based upon the state feedback method, in the control of unstable combustors. This method describes the overall state of a system by a minimal number of state variables that vary with time. The system is controlled by a feedback loop that depends upon the state variables. In many cases, the state variables cannot be fully measured and an observer is used to estimate the state of the controlled system. The state variables feedback approach is most suitable for systems that can be described by a finite number of ordinary differential equations. Such an approach is, however, not suitable for describing the state of systems, such as an unstable combustor, whose behavior is described by partial differential equations. This problem can be handled in simple cases, such as axial instabilities, by approximating the partial differential equations that describe the behavior of the system by an ensemble of an infinite number of ordinary differential equations using orthogonal mode expansions, such as the Galerkin method. Zinn, B. T. and Lores, M. E., *Combustion Science and Technoloy*, 4, 269, 1972. Culick, F. E. C., *"Combustion Instabilities in Licuid Fueled Propulsion Systems-An Overview"*, California Institute of Technology Report, 1988. Since it is impossible to control a system that is described by an infinite number of ordinary differential equations, it is further assumed in such cases that the behavior of the system, in the relevant frequency range, can be described by a finite number of ordinary differential equations that is a subset of the original system of infinite differential equations. A difficulty is encountered in this approach because the determination of the state of the system requires the installation of many sensors along the combustor, which is obviously impractical. Y. Fung and V. Yang *"Active Control of Nonlinear Pressure Oscillations in Combustion Chambers,"* 27th AIAA/ASME/SAE/ASEE Joint Propulsion Conference, Sacremento, Calif., 1991, suggested that this problem be handled in combustors by measuring the pressure at one location and using an observer to estimate the spatial dependence of the pressure with the aid of a model of the system. This approach requires, however, full knowledge of the complex fluid mechanical and combustion processes within the combustor, which is beyond current state of the art even for the simple case of longitudinal instabilities, let alone the more complex radial, transverse and three-dimensional instabilities, which often occur in actual combustors. The difficulties encountered by proposed active control systems for unstable combustors clearly indicate a need for a new active control approach.

In contrast to the detrimental effects produced by the excitation of natural acoustic mode oscillations in propulsion and power generating systems, the excitation of finite amplitude acoustic mode oscillations in practical combustors, such as incinerators, and energy intensive processes, such as dryers and boilers, produces such benefits as fuel savings, increased productivity, reduced emissions and improved product quality. In U.S. Pat. No. 4,699,588, Zinn, et al. have shown that beneficial resonant acoustic oscillations can be excited in industrial processes by use of tunable pulse combustors. Yet, alternate apparatuses and methods for exciting such acoustic oscillations, that require less space and capital investment and are easier to operate, are needed. The invention described herein can be used for these purposes.

SUMMARY OF THE INVENTION

The present invention provides a novel approach for active control of detrimental instabilities in practical combustors or the excitation of beneficial acoustic oscillations in combustion and energy intensive processes, for example. The present invention overcomes the above-described and other problems in prior active control systems. The invented system comprises a sensor, a processing unit including an observer and a controller, and an actuator. The observer analyzes the signal supplied by the sensor and determines, virtually in real time, the modal functions (and hence the amplitudes and phases) and frequencies of the excited combustor modes. Based on the modal functions and frequencies, the controller adaptively determines a gain and phase shift for each mode or uses a predetermined gain and phase shift, and combines the modes to generate a time-varying control signal that is fed to the actuator. Based on the control signal, the actuator produces a secondary system of oscillations within the combustor that tends to damp the instability. Alternatively, the controller can assign a phase and a gain to the actuator signal in a manner that excites oscillations in the process for applications where such oscillations produce beneficial effects.

The observer of this invention uses a frequency domain analysis that avoids the time consuming process of frequency scanning commonly used in fast Fourier transform (FFT) and Wavelets transformers. Instead, the unknown frequencies and amplitudes of the modes of oscillation are determined by the processor using a pair of integrals that are modified versions of Wavelet Transforms, whose integration limits are changed continuously. The frequency of the largest amplitude, dominant mode is determined first in a rapidly converging solution approach. Once the dominant mode has been determined, it is effectively subtracted from the sensor signal as are the other modes as presently known by the observer, and the mode characterization procedure is repeated to determine the characteristics of the mode with the next largest amplitude. Mode characterization as described above is repeated until all modes or interest have been characterized by determining respective modal functions and frequencies. The amount of processor calculations required for each mode identification is very small and comparable to that needed to perform the simplest first order filtering in time domain. The small computational load required by the invention permits the observer to be implemented with a standard micro-processor or micro-controller to analyze, virtually in real time, the characteristics of oscillations with relatively high frequencies up to 5,000 Hz, for example.

An actuator in accordance with this invention is implemented as an injector system for controlling a fluid (e.g., oxidizer fuel) flow into a combustor, engine or the like. The injector system uses a magnetostrictive actuator capable of responding to a control signal with relatively high frequency components. The injector system modulates the fuel flow rate into the combustor to provide highly effective excitation of oscillations with desired characteristics within the system. The injector system thus can be used to attenuate or excite oscillations within the controlled system. Also, in accordance with this invention, drift effects of the injector system caused by hysteresis or heating, are compensated using a separate controller.

These together with other objects and advantages, which will become subsequently apparent, reside in the details of construction and operation as more fully hereinafter described and claimed, reference being made to the accompanying drawings, forming a part hereof, wherein like numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating the principles of the invention.

DESCRIPTION OF THE PREFERRED EMBODIMENT

Figure 1:
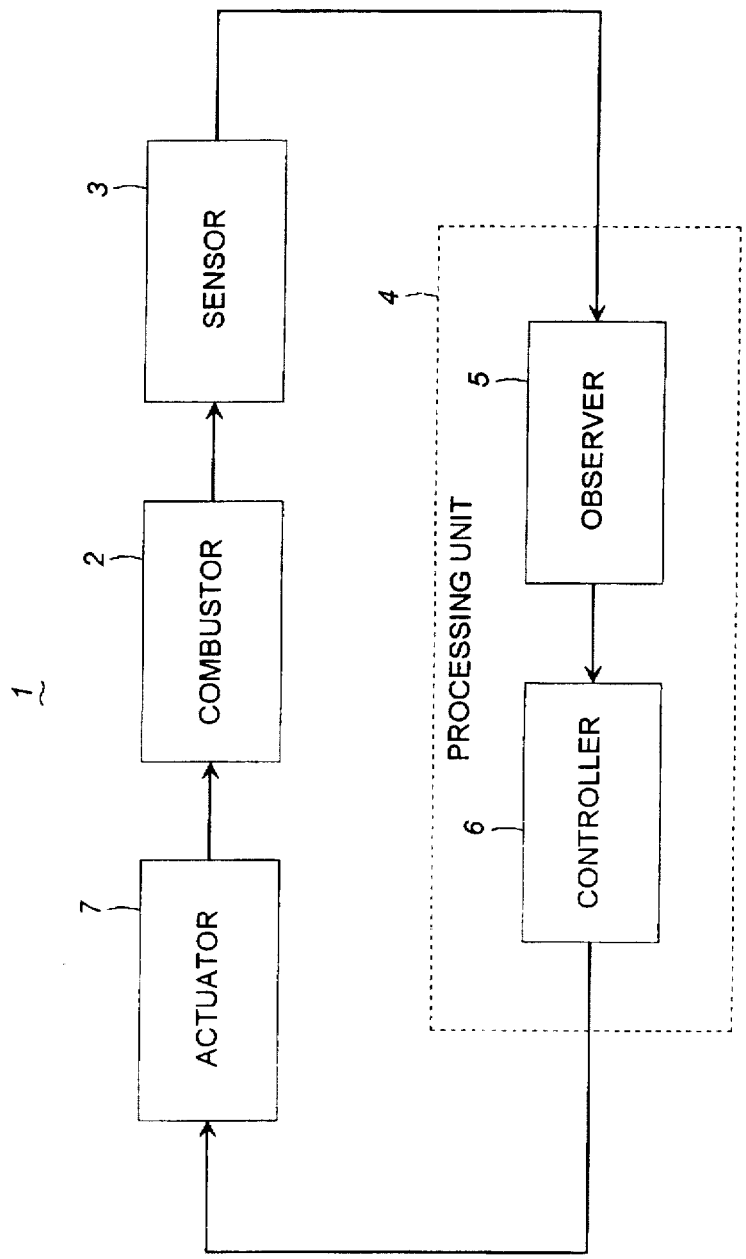
FIG. 1 is a general block diagram of a system for active control of oscillations, in accordance with the present invention.

FIG. 1 is a block diagram of a system 1 of this invention applied to a system to be controlled, specifically, a combustor 2. As previously noted, the system 1 of this invention can be used in many applications, but for ease in understanding the principles of this invention, the following description will be given for a specific application, i. e., a combustion system. However, extensions of this invention to other applications will be readily understood from the following description, and these extensions are to be considered as included in this invention.

In FIG. 1, the combustor 2 receives, and burns fuel, which can cause a combustion instability. As previously explained, a combustion instability exists when energy supplied by the combustion process excites natural acoustic modes of the combustor 2 through a positive feedback process between the combustion heat addition and acoustic oscillations. Depending upon the purpose to which the system 1 is applied, it can suppress detrimental combustion instabilities or excite beneficial combustor oscillations. For example, in applications such as dryers or boilers, it may be desired to promote combustion process oscillations that produce fuel savings, increased productivity, reduced emissions and enhanced product quality. On the other hand, in applications such as rocket motors, ramjets, afterburners and gas turbines, these combustion instabilities must be eliminated quickly to avoid damaging or destruction of such combustors.

Whether combustor oscillations are to be promoted or attenuated for a particular application, the combustor oscillations must be sensed and characterized. To sense a combustor oscillation, a sensor 3 is arranged in contact with and/or in proximity to the combustor 2. For example, the sensor 3 can be a pressure transducer, a transducer sensing vibrations, or a photomultiplier arranged near a window in the combustor 2, that senses the total amount of radiation or the radiation at a specific wavelength from the flame in the combustor 2. Of course, the sensor 3 must have a frequency response sufficient to permit detection of the highest oscillation mode frequency of interest in the combustor.

The sensor 3 is coupled to a processing unit 4. The processing unit 4 includes an observer 5 and a controller 6. The observer 5 receives a signal generated by the sensor 3 and characterizes the combustor oscillations indicated by the received signal. More specifically, the observer 5 determines, virtually in real time, the modal functions (and hence the amplitude and phase) and frequency of each significant mode of oscillation included in the received signal. The observer 5 supplies the controller 6 with the modal functions and frequency of each mode of oscillation. The controller 6 uses the modal functions and the frequency of each mode of oscillation to synthesize a time-dependent control signal with an appropriate gain and phase shift for each identified mode. The gain and phase shift for each mode of oscillation can be predetermined for the system, or if needed, can be determined by a process in which the controller 6 continually adjusts the gain and phase shift of each mode of oscillation as necessary to optimize the damping or enhancement of modes of oscillation, depending upon the objective of the system.

The controller 6 is coupled to output its time-dependent control signal to an actuator 7. The actuator 7 can be realized in several ways and depends upon the system to be controlled. For example, the actuator 7 used to control the combustor 2, can be a speaker that excites pressure oscillations within the combustor 2, based on the control signal. Also, the actuator 7 can be an oscillating valve that periodically varies the air flow rate into the combustor 2, based on the control signal. Further, the actuator 7 can be an injector that modulates the fuel and/or oxidizer flow rate into the combustor 2, based on the control signal. A specific embodiment of the actuator 7 of the injector-type in accordance with this invention, will be described later in this document with respect to FIGS. 6 and 7. In any case, based on the control signal, the actuator 7 acts to dampen or promote oscillations in the combustor 2, depending on the objective of the system.

Figure 2:
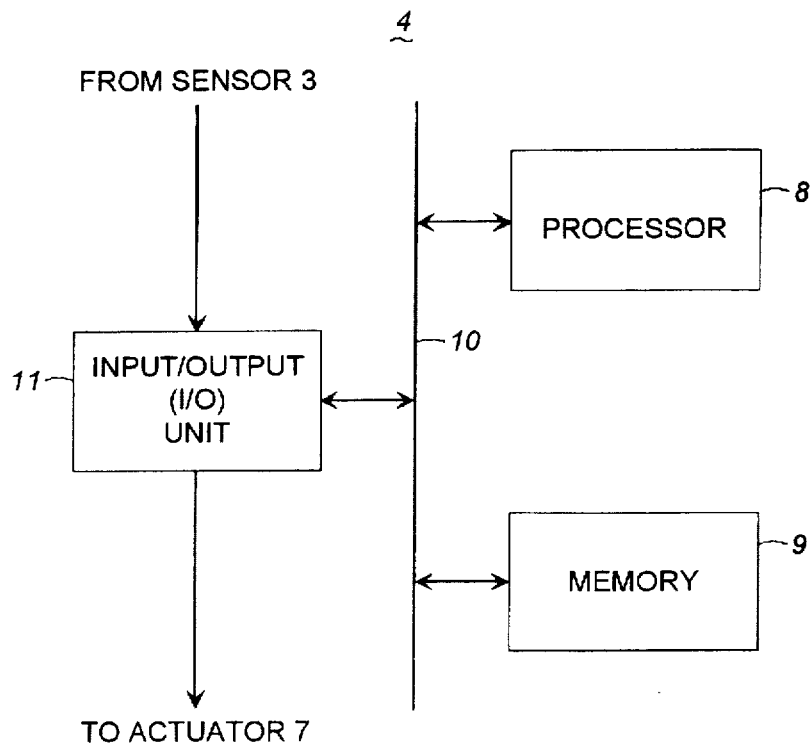
FIG. 2 is a block diagram of a processing unit that can be used to realize the observer and/or controller of this invention.

FIG. 2 is a block diagram of one possible embodiment of the processing unit 4. In FIG. 2, the processing unit 4 includes a processor 8 and a memory 9 coupled to a common bus 10. The processing unit 4 also includes an input/output (I/O) unit 11 coupled to the bus 10. The I/O unit 11 is also coupled to receive the signal from the sensor 3, and coupled to output the control signal generated by the processor 8 and the memory 9, to the actuator 7. In FIG. 2, the processor 8, the memory 9, the bus 10, and the I/O unit 11 perform the functions of both the observer 5 and the controller 6 in FIG. 1. However, if desired, the observer 5 and the controller 6 can be realized as separate micro-controller or processor-based units, for example.

Before proceeding to the specific processing performed by the observer 5 and the controller 6, an explanation of the theory from which the processing of the observer 5 has been derived will be helpful to understand the invention.

Figure 3A:
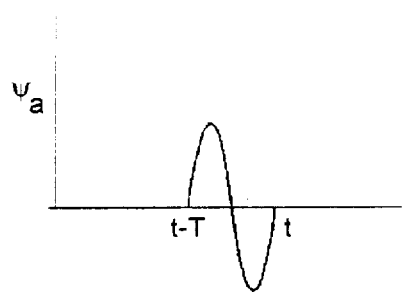
FIGS. 3A and 3B are views of respective wavelets.
Figure 3B:
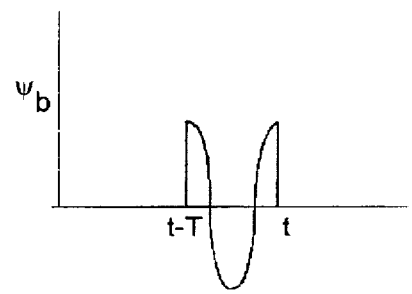

Consider the two modal functions $a(t,\omega)$ and $b(t,\omega)$ obtained from a signal $f(t)$ by the following transformation $$a(t,\omega) = \frac{\omega}{2\pi} \int_{-\infty}^{\infty} \psi_a f(t) dt \qquad (1)$$

$$b(t,\omega) = \frac{\omega}{2\pi} \int_{-\infty}^{\infty} \psi_b f(t) dt \qquad (2)$$

in which $\psi_a$ and $\psi_b$ establish an orthogonal pair of wavelet functions localized around the frequency $\omega$ and a time window between $t-T$ and $t$, where $T=2\pi/\omega$ (for basic information concerning Wavelet transformations, see "Ten Lectures on Wavelets," Ingrid Daubechies, Society for Industrial and Applied Mathematics, Philadelphia, Pa., 1992). While in general, various wavelet functions may be used in conjunction with the present invention, the pair selected for the preferred embodiment is shown in FIGS. 3A and 3B. Specifically, the wavelet functions are $\sin \omega t$ and $\cos \omega t$ that are not identically zero only during the time interval from t–T to t. With this pair of wavelet functions, the integrals in Eqs. (1) and (2) assume the simple form in which the time localization appears explicitly in the integral limits.

$$a(t,\omega) = \frac{2}{T} \int_{t-T}^{t} \sin(\omega t) f(t) dt \quad (3)$$

$$b(t,\omega) = \frac{2}{T} \int_{t-T}^{t} \cos(\omega t) f(t) dt \quad (4)$$

Consider now a reverse transformation that reconstructs a signal y(t) from the modal functions a(t,ω) and b(t,ω) determined by formulas (3) and (4) as follows:

$$y(t,\omega) = a(t,\omega) \sin \omega t + b(t,\omega) \cos \omega t \quad (5)$$

Equations (3), (4) and (5) define a transformation f(t)→y(t, ω) from the time domain into time and frequency domain.

The transformation defined by Eqs. (3), (4) and (5) possesses the following qualities:

I. The transformation f(t)→y(t) is linear; that is, if $f_1(t) \rightarrow y_1(t)$ and $f_2(t) \rightarrow y_2(t)$ then $Uf_1(t)+Vf_2(t) \rightarrow Uy_1(t)+Vy_2(t)$ where U and V are constants.

II. If the input f(t) oscillates with a frequency Ω, the output signal y(t) also oscillates with the same frequency Ω even if the frequency ω, which is used in y(t), differs from the actual frequency Ω; that is, ω≠Ω.

III. The frequency of the input signal can be determined analytically from the above expressions for the coefficients a(t) and b(t) using the formula $$\Omega^2 - \omega^2 = \frac{\omega(\dot{a}\sin\omega t + \dot{b}\cos\omega t)}{\dot{a}\cos\omega t - \dot{b}\sin\omega t} \quad (6)$$

where $\dot{a}$ and $\dot{b}$ are the derivatives of a(t) and b(t), respectively, with respect to time.

Note that the reconstructed signal is a function of the frequency ω even though it oscillates with the same frequency Ω as the original signal f(t). This is so because the reconstructed signal possesses a phase and attenuation with respect to the signal f(t) that depends upon the difference between the actual frequency Ω and the estimated frequency ω. Thus, for full recovery of the signal f(t), the actual frequency Ω must be determined. Wavelet or Windowed Fourier transforms require scanning of many frequencies to capture the oscillation modes in a signal. For this reason Wavelet and Fourier transformers are not adequate for signal processing in real time control applications. In the observer of this invention, however, Equation (6) is used to update the lower limit of the integral and thus in fact to update the wavelet functions $\psi_a$ and $\psi_b$. The adaptation of the limits of the integral leads to a converging process in which the estimated frequency ω approaches the actual frequency Ω. For this reason, the dependence of the modal functions a(t) and b(t) upon a particular frequency ω becomes negligible and, thus, may be considered as functions of time alone. The converging transformation possesses the following important quality.

IV. When the input signal f(t) contains several modes of oscillation that oscillate with different frequencies, the observer inherently identifies the frequency of the largest amplitude mode of oscillation first.

To determine the modal content of the input signal, the observer mode characterization processing is repeated for each mode until the characteristics of all modes of interest have been determined. Hereinafter, the completion of the characterization of all modes of interest will be referred to as an 'iteration' of the processing performed by the observer 5.

A simplified example of the successive characterization of modes of oscillation is given below. In the first iteration of this process, the mode with the largest amplitude (that is, the largest magnitude of modal functions) is characterized using a pair of integrals with variable limits, and output as the observer output signal y(t). As will be explained in more detail with respect to FIGS. 4, 5A, 5B and 5C, the dominant mode is then effectively subtracted from the sensor signal along with predetermined initial estimations of the other modes of interest, to generate a new modal input signal f(t) that is provided to the observer. This modal input signal is then analyzed by the observer using equations derived from modified versions of integrals with time-varying limits, to generate another observer output signal. The two characterized modes are then effectively subtracted from the signal received from the sensor 3, along with the initialized modes as yet to be determined by the observer, to generate another modal input signal for the observer. The processing performed by the observer 5 continues in the above-described manner until all modes of oscillation have been characterized in one iteration. In the next iteration, the time is stepped (i.e., t=t+dt) and the above-described procedure is repeated. Starting with initial values, the modal output signals are improved with each iteration, until they converge to the actual modes of oscillation in the controlled system.

Because of the large numerical effort, determination of the integrals described in Eqs. (3) and (4) is not practical for real time processing. However, this invention uses recursive formulae that substantially reduce the numerical efforts required for the evaluation of the integrals in Eqs. 2 and 3. These recursive formulae are derived from Eqs. 2 and 3 as follows:

$$a(t+dt) = \frac{2}{T} \int_{t-T+dt}^{t+dt} f(\tau)\sin(\omega\tau)d\tau = \quad (7)$$

$$a(t) + \frac{2}{T} [f(t+dt) - f(t-T+dt)] \cdot \sin(\omega t) \cdot dt$$

$$b(t+dt) = \frac{2}{T} \int_{t-T+dt}^{t+dt} f(\tau)\cos(\omega\tau)d\tau = \quad (8)$$

$$b(t) + \frac{2}{T} [f(t+dt) - f(t-T+dt)] \cdot \cos(\omega t) \cdot dt$$

Equations (7) and (8) are solved by the observer 5 using the following procedure. First, a data array of short time intervals or increments Δt whose sum equals one estimated period of the mode of oscillation T is established. The number of elements in this array equals T/Δt, where Δt is the time step for each iteration. Each time step in the cycle corresponds to a different location in the array. Thus, a cycle or period starts at the first element and ends at the last element in the array. According to Eqs. (7) and (8), the modal functions a(t+dt) and b(t+dt) at time t+dt are determined by multiplying the difference between the current value of the modal input signal f(t+dt) supplied to the observer, and the modal input signal f(t–T+dt) supplied to the observer, obtained a period of the mode of oscillation earlier, by (2/T) sin (ωt) or (2/T) cos (ωt) and adding the result to the modal functions a(t) or b(t) at time t, respectively. This procedure substantially reduces the numerical effort required for the determination of the modal functions a(t) and b(t) (see Eqs. (1) and (2)) of the observed mode within the modal input signal.

The period of the observed mode generally varies during the calculation due to actual changes in the process and/or an initial error in the assumed frequency. Consequently, the length of the data array corresponding to a period of the assumed frequency, also changes. Unless corrective steps are taken, this frequency variation may introduce an error into the computed modal functions a(t) and b(t). This error is for practical purposes eliminated in the processing used by the observer 5 by the following procedure. In addition to the continuous computations of the modal functions a(t) and b(t), using Eqs. (7) and (8), the values of A(T) and B(T) at the end of each period T are determined by use of the following equations:

$$A(T) = \frac{2}{T} \int_{t_o}^{t_o+T} f(\tau)\sin(\omega\tau)d\tau \quad (9)$$

$$B(T) = \frac{2}{T} \int_{t_o}^{t_o+T} f(\tau)\cos(\omega\tau)d\tau \quad (10)$$

where $t_o$ denotes the beginning of a period. The values of A(T) and B(T), calculated using Eqs. (9) and (10), are used as the initial values for the calculation of the modal functions a(t) and b(t) using Eqs. (7) and (8), at the beginning of the following cycle. Using this approach, the instantaneous variations of the modal functions a(t) and b(t) are determined by continuously calculating their values by use of Eqs. (7) and (8) and long term error accumulation is eliminated by replacing the instantaneous values of the modal functions a(t) and b(t) with the average values A(T) and B(T) calculated using Eqs. (9) and (10).

Figure 4:
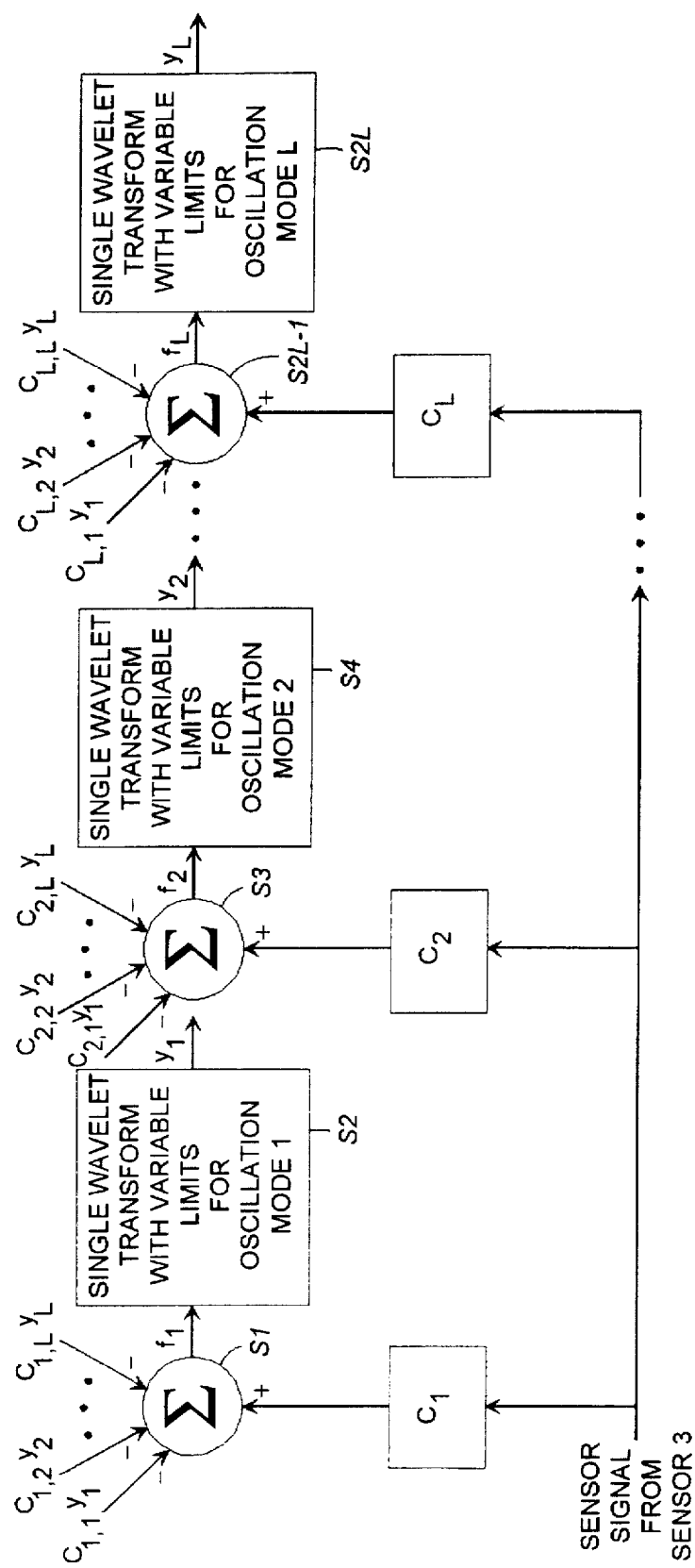
FIG. 4 is a flow chart of processing used to identify the modal functions and frequency of modes of oscillation, in accordance with the present invention.

FIG. 4 is a flow chart of the processing performed by the observer 5 to determine the modes of oscillation present in the sensor signal. The flow chart of FIG. 4 is a generalization of the processing described previously. The observer determines a modal input signal $f_1$ by weighted summation of the sensor signal and modal output signals $y_1, y_2, \ldots, y_L$ using initial values for the modal functions and the frequency according to the equation $y_j = a_j \sin(\omega_j t) + b_j \cos(\omega_j t)$ where j is the mode index assuming values from 1 to L. L is the total number of modes of oscillation to be analyzed by the observer 5, and can be predetermined and set by the user before beginning the processing of FIG. 4. In step S1 of FIG. 4, in the first iteration, the observer 5 generates a modal input signal $f_1$ by effectively subtracting from the signal received from the sensor (in the general case, the received signal can be weighted by a predetermined constant $c_1$) a weighted sum of all L modes of interest $c_{1,1}y_1$ to $c_{1,L}y_L$ using initial values of the modal functions and frequencies for the L modes and predetermined values for the constants $c_{1,1}$ to $c_{1,L}$. In step S2, in the first iteration, the observer 5 characterizes (i.e., determines) the modal functions and the frequency) the most dominant mode of oscillation of the received signal. The observer generates a modal output signal $y_1$ based on this characterization that is stored in the memory 9 for use in the next iteration. In step S3, the initialized modal output signals $y_1, y_2, \ldots, y_L$, weighted by multiplication with the coefficients $c_{2,1}, c_{2,0}, \ldots, c_{2,L}$, are subtracted from the signal received from the sensor multiplied by a gain factor $c_2$, to generate a modal input signal $f_2$. In step S4, the observer 5 uses the modal input signal $f_2$ to characterize the second mode of oscillation. The processing performed by the observer 5 continues in this manner until modal functions and frequencies for all L modes of interest have been determined in the first iteration. In the next iteration, the modal functions and frequencies of the modes determined in the previous iteration are used to determine modal input signals for each mode. With each iteration of the processing of FIG. 4, the observer 5 generates modal output signals $y_1, y_2, \ldots, y_L$ that are closer to the actual modes of oscillation of the sensor signal.

Figure 5A:
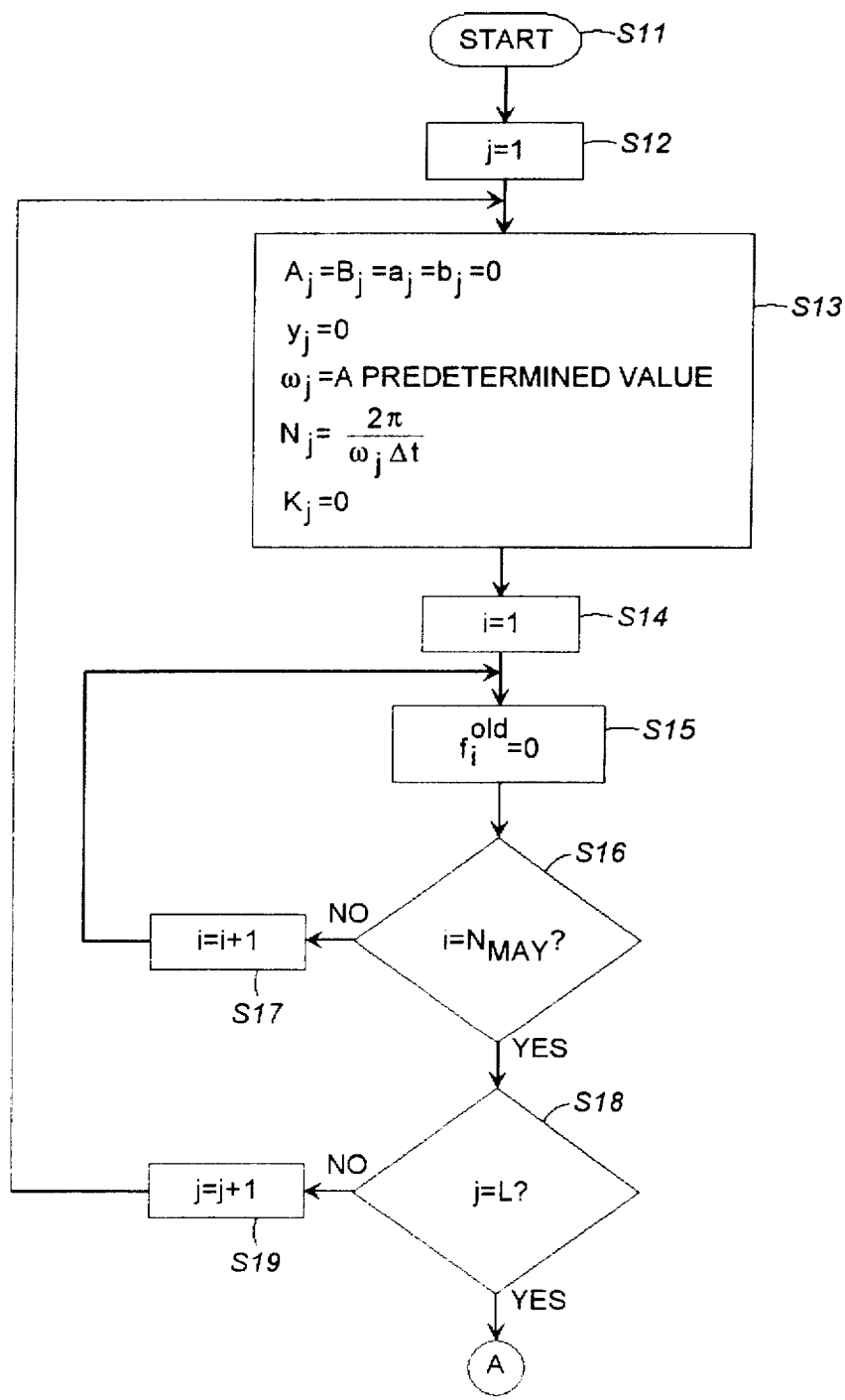
FIGS. 5A, 5B and 5C are flow charts of processing performed by the observer to identify modal functions and frequencies of modes of oscillation in a sensor signal, in accordance with the present invention.
Figure 5B:
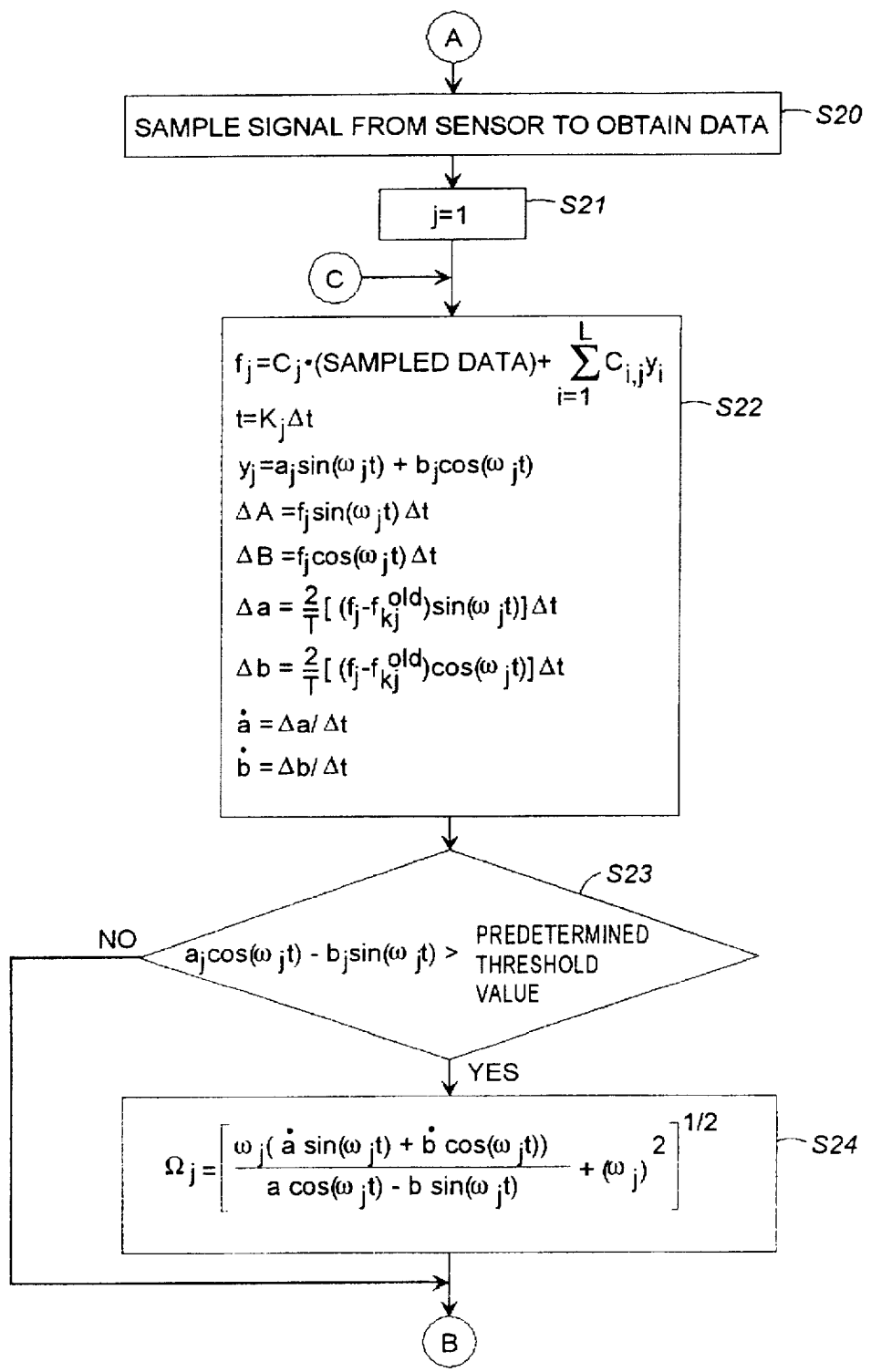
Figure 5C:
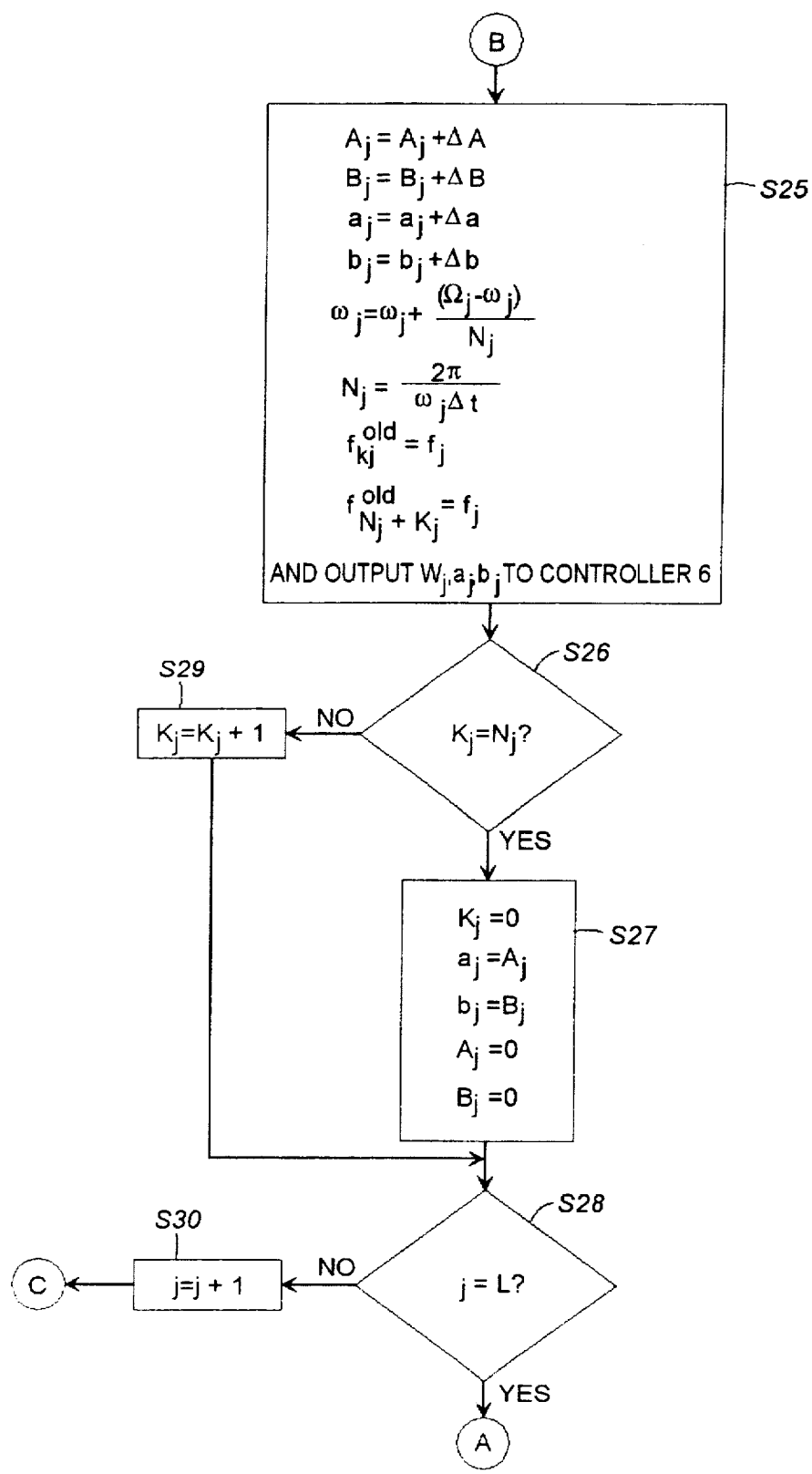

FIGS. 5A, 5B and 5C are flow charts of processing performed by the observer 5 to characterize oscillation modes included in the signal received from the sensor 3. This processing can be performed, for example, by the processor 8 under control of a control program stored in the memory 9 in FIG. 2, using sample data obtained from the signal received from the sensor 3 by the I/O unit 11.

Before processing starts in FIG. 5A, the number of oscillation modes L to be characterized and the maximum permitted length of a data array $N_{MAX}$ are predetermined and programmed into the memory 9 (FIG. 2) so that the processor 8 has access to these values. In FIG. 5A, processing starts in step S11. In step S12, the processor 8 sets the mode index j=1. The mode index j is used by the processor 8 to identify the mode of oscillation to which various parameters pertain. The mode index j assumes values ranging from 1 to L, depending upon the mode of oscillation under analysis. In step S13, initialization of various parameters is performed. Specifically, the average values of modal functions over a period of the jth mode of oscillation $A_j$, $B_j$ and the instantaneous values of the modal functions $a_j$, $b_j$ are set to zero. Recall that the values $A_j$, $B_j$ are used to replace the instantaneous values of $a_j$, $b_j$ at the end of each period of the mode of oscillation j. Also, in step S13, the output of mode j, $y_j$, is set to zero. Further, the observed frequency of the jth mode, $\omega_j$, is set to a predetermined value. This predetermined value is merely an initial estimate of the frequency of the jth mode of oscillation. The initial estimate $\omega_j$ can be predetermined and programmed by an operator or an external device. In addition, the length of the array of the jth mode, $N_j$, is set to $2\pi/(\omega_j \Delta t)$. Finally, with respect to step S13, the location index in the jth mode data array, $k_j$, is set to zero.

In step S14, an index i used for initialization, is set to 1. In step S15, the value at the location i of the data array, $f^{old}_i$, is set to zero. In step S16, the processor 8 determines whether the index i equals the maximum size of a data array $N_{MAX}$. If not, the index i is incremented by 1 in step S17 and processing returns to step S15. If the index i is equal to the maximum size of a data array, $N_{MAX}$, all values in the data array $f^{old}_i$ of mode j have been initialized to zero and processing proceeds to step S18. In step S18, a determination is made to establish whether j=L. If not, j is incremented by 1 in step S19 and processing proceeds to step S13 to continue initialization of the parameters and data array $f^{old}_i$ for the jth mode. On the other hand, if j equals the number of modes of oscillation to be observed L, initialization of the parameters and data array has been performed for all L modes so that the processor 8 in conjunction with the memory 9 and the I/O unit 11, are now ready to determine a modal input signal and characterize a mode of oscillation. Accordingly, processing proceeds to step S20.

In step S20 of FIG. 5B, the processor 8 causes the I/O unit 11 to sample the signal received from the sensor 3. The resulting data sample is stored in the memory 9. In step S21, the processor 8 sets the mode index j equal to 1. This step is necessary if more than one mode of oscillation is to be characterized because step S19 of the initialization processing of FIG. 5A will cause j to assume a value greater than 1. In step S22, the processor 8 in conjunction with the memory 9 calculates the following parameters:

$$f_j = c_j \cdot (\text{SAMPLED DATA}) + \sum_{i=1}^{L} c_{i,j} y_i$$

$t = k_j \Delta t$ $y_j, a_j \sin(\omega_j t) + b_j \cos(\omega_j t)$ $\Delta a = f_j \sin(\omega_j t) \Delta t$ $\Delta B = f_j \cos(\omega_j t) \Delta t$ $$\Delta a = \frac{2}{T} \left[(f_j - f_{k_j}^{old})\sin(\omega_j t)\right] \Delta t$$

$$\Delta b = \frac{2}{T} \left[(f_j - f_{k_j}^{old})\cos(\omega_j t)\right] \Delta t$$

$\dot{a} = \Delta a / \Delta t$ $\dot{b} = \Delta b / \Delta t$

The coefficients $c_j$ and $c_{i,j}$ are predetermined values stored in the memory 9 before starting the processing in step S10 of FIG. 5A. Also, the time interval $\Delta t$ is predetermined and stored in the memory 9. The time interval $\Delta t$ is predetermined in such a way that the time interval $\Delta t$ is sufficiently long so that the processor 8 can perform an iteration of the processing of FIGS. 5B and 5C within the time interval $\Delta t$, but is also predetermined to be short enough that as many samples as possible of the signal received from the sensor, can be obtained over a period of the mode of oscillation with the highest frequency of interest. In step S23, a determination is made to establish whether $a_j \cos \omega_j t - b_j \sin \omega_j t$ is greater than a predetermined threshold value. The predetermined threshold value is stored in the memory 9 before starting the processing of FIGS. 5A, 5B, 5C and is used to prevent division by unreasonably small values in step S24 (note that if the term $a_j \cos \omega_j t - b_j \sin \omega_j t$ is small in the denominator of the equation for $\Omega_j$ in step S24, the frequency estimate $\Omega_j$ may assume large, inaccurate values). If the determination in step S23 is affirmative, processing proceeds to step S24. On the other hand, if the determination in step S23 is negative, step S24 is bypassed and processing proceeds directly to step S25.

In step S24, the frequency $\Omega_j$ is determined based on the following equation:

$$\Omega_j = \left[ \frac{\omega_j(a\sin(\omega_j t) + b\cos(\omega_j t))}{a\cos(\omega_j t) - b\sin(\omega_j t)} + (\omega_j)^2 \right]^{1/2} \quad (11)$$

Thus, the processor 8 uses the values $\omega_j$, a, b, t, $\dot{a}$, $\dot{b}$ stored in the memory 9 to determine the frequency $\Omega_j$, which defines the frequency of the mode of oscillation with mode index j.

In step S25 of FIG. 5C, the processor 8 in conjunction with the memory 9 calculates the following parameters:

$A_j = A_j + \Delta A$ $B_j = B_j + \Delta B$ $a_j = a_j + \Delta a$ $b_j = b_j + \Delta b$ $$\omega_j = \omega_j + \frac{(\Omega_j - \omega_j)}{N_j}$$

$$N_j = \frac{2\pi}{\omega_j \Delta t}$$

$f^{old}_{k_j} = f_j$ $f^{old}_{N_j + k_j} = f_j$

Thus, the values $A_j$, $B_j$, $a_j$ and $b_j$ are updated by adding the changes in the values $\Delta A$, $\Delta B$, $\Delta a$, $\Delta b$, respectively, over the time interval $\Delta t$ (i.e., for one iteration), to the former values of these parameters as initialized or determined in the previous iteration. The estimated frequency $\omega_j$ is also updated. However, rather than setting the value $\omega_j = \Omega_j$, $\omega_j$ is set equal to $\omega_j + (\Omega_j - \omega_j)/N_j$ so that the frequency $\omega_j$ is not changed radically to ensure smooth convergence to the frequency $\Omega_j$ of the mode of oscillation under analysis. This updated frequency $\omega_j$ and the modal functions $a_j$, $b_j$ are output to the controller 6 for determination of the control signal.

Because $\omega_j$ generally changes with each iteration, the number of samples $N_j$ also may change. Thus, if $\omega_j$ is smaller than determined in the previous iteration, more samples are needed. To provide these samples, not only is $f^{old}_{k_j}$ set equal to $f_j$, but $f^{old}_{N_j+k_j}$ is also set equal to $f_j$. Thus, in the event that $\omega_j$ has a smaller value than determined by the previous iteration so that the data array has more elements (i.e., values) than the previous iteration, there will be a relatively good estimate for data stored in elements $k_j$ at time intervals beyond the range of the $N_j$ used in the previous iteration. In step S26, a determination is made to establish whether $k_j$ equals $N_j$. If $k_j$ equals $N_j$, the processing performed by the processor 8 in conjunction with memory 9 proceeds to step S22 in which case $k_j$ is set to zero, $a_j$ is set to $A_j$, $b_j$ is set to $B_j$, and thereafter both $A_j$ and $B$ are set to zero. As previously explained, this operation provides $a_j$ and $b_j$ with good estimates for the next iteration by setting these modal functions to $A_j$ and $B_j$, respectively. Because $A_j$ and $B_j$ are obtained by averaging over the previous period of the frequency $\omega_j$ of the jth mode of oscillation, they are not subjected to long term error accumulation. In preparation for the next iteration, the values of $A_j$ and $B_j$ are set to zero. From step S27, processing proceeds to step S28. If the determination in step S26 is negative, $k_j$ is incremented by one in step S29 and processing proceeds to step S28.

In step S28, the processor 8 in conjunction with the memory 9 determines whether j equals L. If not, the mode index j is incremented in step S30 and processing proceeds to step S22. On the other hand, if j equals L in step S28, processing proceeds to step S20 to obtain the next value of the sensor signal for the next time step $\Delta t$.

As previously noted, in step S24 of FIG. 5B, the observer 5 outputs the frequency $\omega_j$ and modal functions $a_j$, $b_j$ to the controller 6. If the observer 5 and the controller 6 are realized together as the processing unit 4 of FIG. 2, this output is unnecessary as the processor 8 will have access to these values stored in the memory 9. Thus, the controller 6 needs only to use an appropriate gain factor $G_j$ and the phase shift $\phi_j$ to be used for each mode in the synthesized control signal. The gain factor $G_j$ and the phase shift $\phi_j$ for each mode can be stored in the memory 9 as predetermined values. In an application in which the gain factor $G_j$ and the phase shift $\phi_j$ cannot be determined a priori, the modal output signals can be used to adaptively adjust the gain factor $G_j$ and the phase shift $\phi_j$ in an iterative process. An example of such an iterative process used to damp oscillation modes is described below with respect to FIGS. 6A and 6B.

Figure 6A:
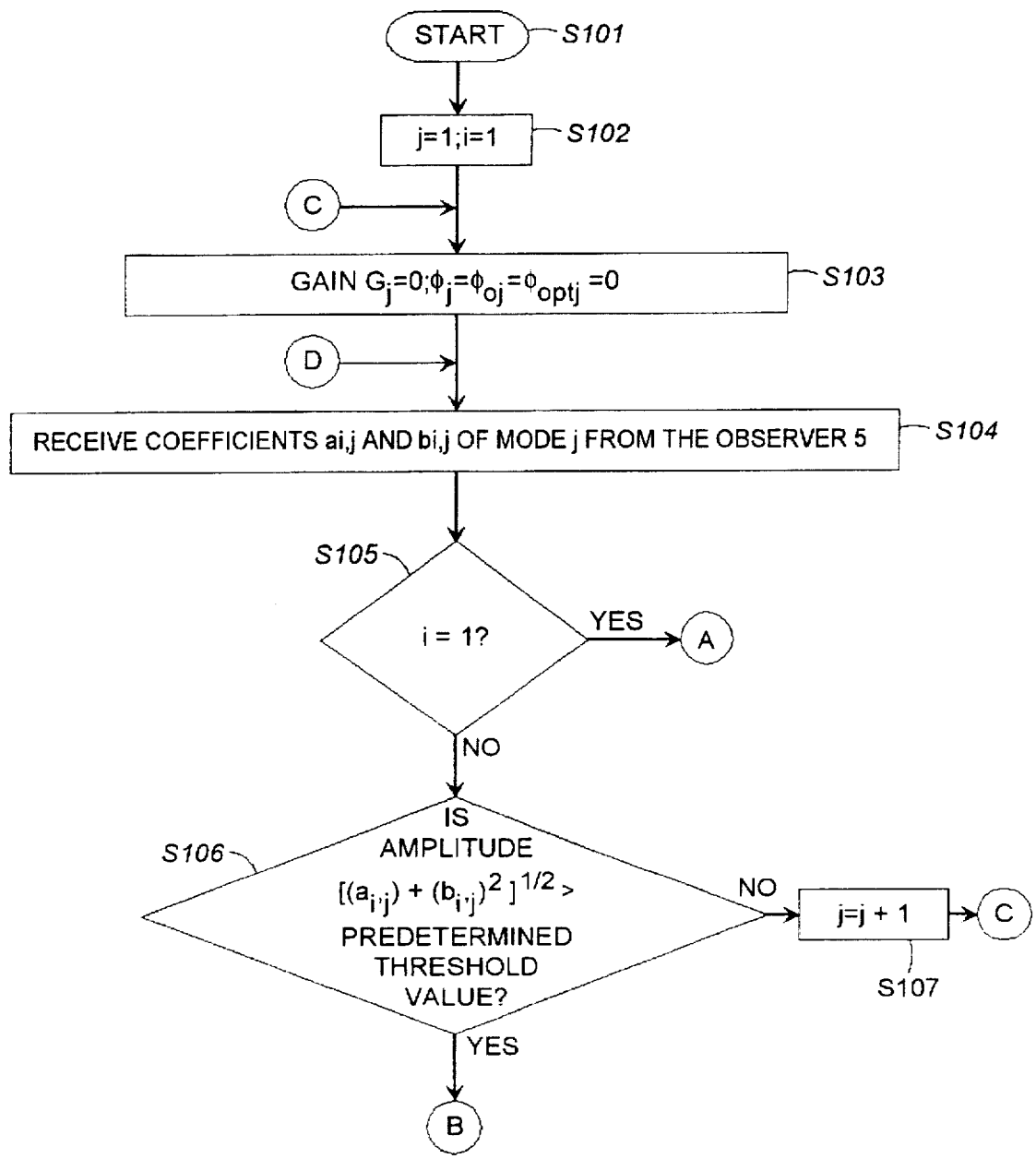
FIGS. 6A and 6B are flow charts of processing performed by the controller to determine the optimal phase and minimum gain required for suppressing undesirable oscillations, in accordance with the present invention.

In FIG. 6A, processing performed by the controller 6 (which in this case is the processor 8 in conjunction with the memory 9 and the I/O unit 11 (see FIG. 2)) begins in step S101. In step S102, the mode index j is set to 1. This mode index j is not the same mode index j used in FIGS. 5A, 5B and 5C, but serves a similar purpose, that is, to distinguish the modes to which various parameters pertain. Also, in step S102, the index i is set to 1. The index i is an index corresponding to time. Thus, this index is different from the index i used in initialization in the processing of FIGS. 5A through 5C. In step S103, the gain $G_j$ is set to zero, as are the phase values $\phi_j$, $\phi_{oj}$, and $\phi_{optj}$ for all values of the mode index j. The phase $\phi_j$ is the current value of the phase used to generate the control signal, $\phi_{oj}$ is the initial value of the phase used to generate the control signal with the current gain $G_j$, and $\phi_{optj}$ is the estimated optimal phase for the control signal.

In step S104, the controller 6 receives the coefficients $a_{i,j}$ and $b_{i,j}$ of mode j from the observer 5. If the observer 5 and the controller 6 are realized together as the single processing unit 4 of FIG. 2, the observer 5 need not output the coefficients $a_{i,j}$ and $b_{i,j}$ of the mode j because the memory 9 storing these coefficients, is common to both the observer 5 and the controller 6. However, if the observer 5 and the controller 6 are implemented as separate microcontroller- or microprocessor-based units, step S104 is performed to provide the controller 6 with the coefficients $a_{i,j}$ and $b_{i,j}$ of the mode j from the observer 5.

In step S105 of FIG. 6A, a determination is made to establish whether the mode index i is equal to 1. If so, processing proceeds to step S113. On the other hand, if the mode index i is not equal to 1, processing proceeds to step S6 of FIG. 6A.

In step S106, a determination is made to establish whether the mode amplitude or magnitude, $[(a_{i,j})^2+(b_{i,j})^2]^{1/2}$, is greater than a predetermined threshold value. This predetermined threshold value is stored in the memory 9 in advance of starting the processing of FIGS. 6A and 6B. The determination in step S106 establishes whether the amplitude of the jth mode of oscillation is sufficiently large that it should be damped. If the determination in step S106 is negative, j is incremented by 1 in step S107 and processing returns to step S103 in FIG. 6A. On the other hand, if the determination in step S106 is affirmative, processing proceeds to step S108 of FIG. 6B.

In step S108, the processor 8 in conjunction with the memory 9 determines whether $[(a_{i,j})^2+(b_{i,j})^2]^{1/2}$ is greater than $[(a_{i-1,j})^2+(b_{i-1,j})^2]^{1/2}$. The determination in step S108 therefore establishes whether the amplitude of the jth mode of oscillation is increasing over a time step defined by the index i. If the determination of step S108 is affirmative, processing proceeds to step S109. On the other hand, if the determination in step S108 is negative, processing proceeds to step S110. In step S109, a determination is made to establish whether the gain $G_j$ is equal to zero. If the gain $G_j$ is zero, processing proceeds to step S111 in which the gain $G_j$ is increased, for example, by a predetermined increment stored in the memory 9 in advance of performing the processing of FIGS. 6A and 6B. From step S111, processing proceeds to step S112 where $\phi_{oj}$ and $\phi_{optj}$ are set equal to $\phi_j$, and control proceeds to step S113. On the other hand, if the determination of step S109 establishes that the gain $G_j$ does not equal zero, processing proceeds to step S114 in which $\phi_{optj}$ is set to $\phi_j+90°$. Step S114 is performed because, if the gain $G_j$ is not equal to zero in step S109 and the current magnitude of the present modal functions $a_{i,j}$, $b_{i,j}$ are greater than the magnitude of the previous modal functions $a_{i-1,j}$, $b_{i-1,j}$ as determined in step S108, the phase $\phi_j$ used to generate the control signal in step S116, must be incorrect by at least 90°. Thus, step S14 is used to adjust the phase $\phi_{optj}$ for use in step S110 where the phase $\phi_j$ is determined. In step S115, a determination is made to establish whether $\phi_j-\phi_{oj}$ is greater than 360°. If so, further adjustments of the phase $\phi_j$ to improve damping of the jth mode of oscillation will be fruitless because the gain $G_j$ is insufficient to damp the jth mode of oscillation. Thus, if the determination in step S115 is affirmative, processing proceeds to step S111 to increase the gain $G_j$ by a predetermined increment so that the jth mode of oscillation can be damped. On the other hand, if the determination in step S115 is negative, processing proceeds to step S110. In step S110, $\phi_j$ is set equal to $\phi_j+\Delta t(\phi_{optj}-\phi_j)/\tau$. The newly determined phase $\phi_j$ represents the new controller phase for the jth mode of oscillation. Rather than radically changing the previous phase value $\phi_j$, the factor $\Delta t/\tau$ where $\tau$ is greater than $\Delta t$, is used to gradually adjust the current phase $\phi_j$ to the estimated optimal phase $\phi_{optj}$. The time constant $\tau$ is predetermined and stored in the memory 9 before the start of the processing in FIGS. 6A and 6B as is the time interval $\Delta t$ (this $\Delta t$ is not necessarily related to the time interval $\Delta t$ of FIGS. 5A through 5C).

After step S110 or step S112 are performed, processing proceeds to step S113 to determine if j=L (this L is the same as that L used in the processing of FIGS. 5A, 5B and 5C). If so, one iteration of phase adjustments for all of the L modes of interest has been completed. Accordingly, in step S115, the controller 6 (i.e., the processor 8 in conjunction with the memory 9 and the I/O unit 11), generates and outputs the control signal:

$$\sum_{j=1}^{L} \{G_j[a_{i,j}\sin(\omega_{i,j}t+\phi_j)+b_{i,j}\cos(\omega_{i,j}t+\phi_j)]\}.$$

This control signal is output from the I/O unit 11 to the actuator 7.

After outputting the control signal in step S116, processing proceeds to step S117 to step the time by incrementing the index i by 1. After performing step S117, processing proceeds to step S18 to set the mode index j equal to 1 preparatory to performing the next interaction of the processing of FIGS. 6A and 6B. After step S118 in FIG. 6B, processing proceeds to step S104 of FIG. 6A. Returning to step S113 of FIG. 6B, if j is not equal to L in step S113, the phase and/or gain has yet to be determined for all L modes of oscillation. Accordingly, in step S119 of FIG. 6B, the mode index j is incremented by 1 and processing proceeds to step S104 of FIG. 6A.

The processing performed by the processing unit 4 in FIGS. 5A, 5B, 5C and FIGS. 6A and 6B, provides damping of combustion instabilities virtually in real time. With this invention, performance of systems such as the combustor 2 can be enhanced well beyond the capabilities of systems developed before this invention. To more fully benefit from the rapid characterization of oscillation modes and generation of an appropriate control signal made possible by the processing of FIGS. 5A, 5B, 5C, and FIGS. 6A and 6B, a fast response actuator 7 is needed. An embodiment of such an actuator is explained below with reference to FIG. 7.

Figure 7:
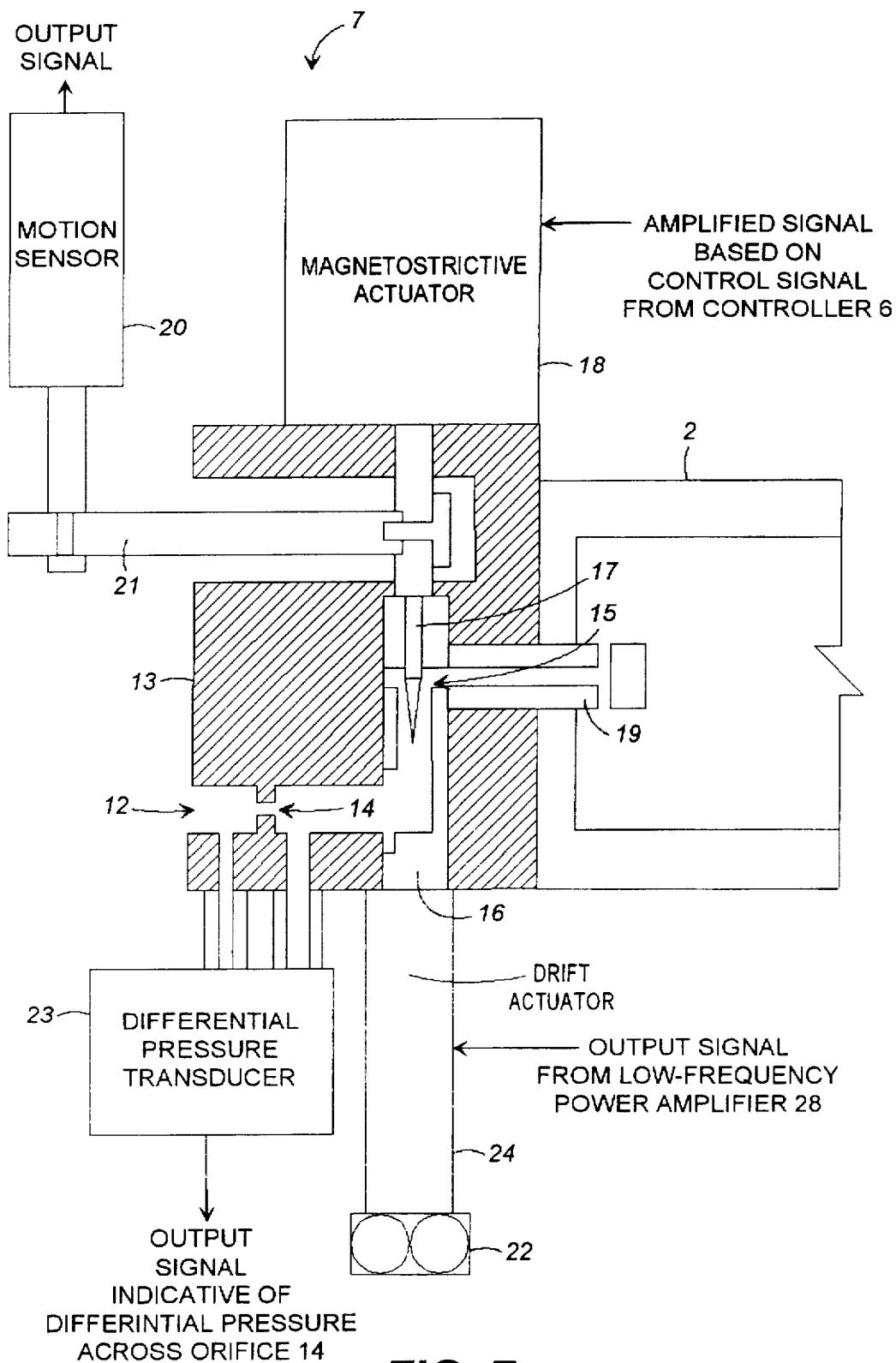
FIG. 7 is a cross-sectional view of a fast response actuator and a drift actuator in accordance with this invention.

FIG. 7 is an embodiment of the actuator 7 realized as a fuel injector. Fuel is supplied to the injector through a supply port 12 defined by a housing 13. From the supply port 12, the fuel moves through an orifice 14 defined by the housing 13, and into an orifice 15 created between the inner wall of a tube 16 and outer wall of a tapered needle 17. A magnetostrictive actuator 18 is coupled to reciprocate the tapered needle 17 in an up-and-down motion in FIG. 7 in response to changes in an electric field input based on the control signal from the controller 6. Preferably, the control signal is amplified by a relatively high-frequency power amplifier (not shown) coupled between the controller and the magnetostrictive actuator 18 so that the magnetostrictive actuator receives an amplified version of the control signal. The movement of the tapered needle 17 causes changes in the effective area of the orifice 15. Since the flow rate of the fuel is directly proportional to the magnitude of the orifice area 15, the time dependence of the fuel flow rate through the orifice 15 can be modulated by periodic or quasi-periodic variation of the orifice area 15 based on the control signal from the controller 6. This is accomplished by controlling the reciprocating motion of the needle 17 by appropriately varying the electric input into the magnetostrictive actuator 18 based on the control signal from the controller 6. The variation of the fuel flow rate through the orifice 15 results in a variable fuel injection rate into the combustor 2 through the injection tube 19. A motion sensor 20 is coupled to the needle 17 by a member 21. The motion sensor 20 generates an output signal for monitoring the movement of the needle 17, and, if necessary for the particular application in which this invention is used, for controlling its motion in a feedback manner with an appropriate controller (not shown) in a closed loop. A knob 22 is used to set the mean position of the needle 17 relative to the opening at the end of the tube 16, to control the mean area of the orifice 15 and thus the mean fuel flow rate through the injector. The flow rate through the injector is determined by measuring the pressure drop across orifice 14 using a differential pressure transducer 23. The differential pressure transducer 23 generates an output signal indicative of the differential pressure across the orifice 14. The output signal from the differential pressure transducer 23 is used to control the mean area of the orifice 15 with a drift actuator 24, as will be described below.

The magnetostrictive actuator 18 provides the injector with a fast response time, a large actuation force and appreciable displacement amplitude. The use of a magnetostrictive actuator offers design simplicity, rapid response time and actuation force that are superior to those offered by most solenoid motors and actuators. However, a controller is needed to compensate for the large hysteresis of the Terfenol-D™ material that comprises the core of the magnetostrictive actuator 18 (for example, such as the magnetostrictive actuator manufactured by Etrema Products™, Inc. of Ames, Iowa), its significant thermal expansion and variation of operational characteristics with time. In accordance with this invention, a controller 25 for the magnetostrictive actuator 18 is described below with reference to FIG. 8.

Figure 8:
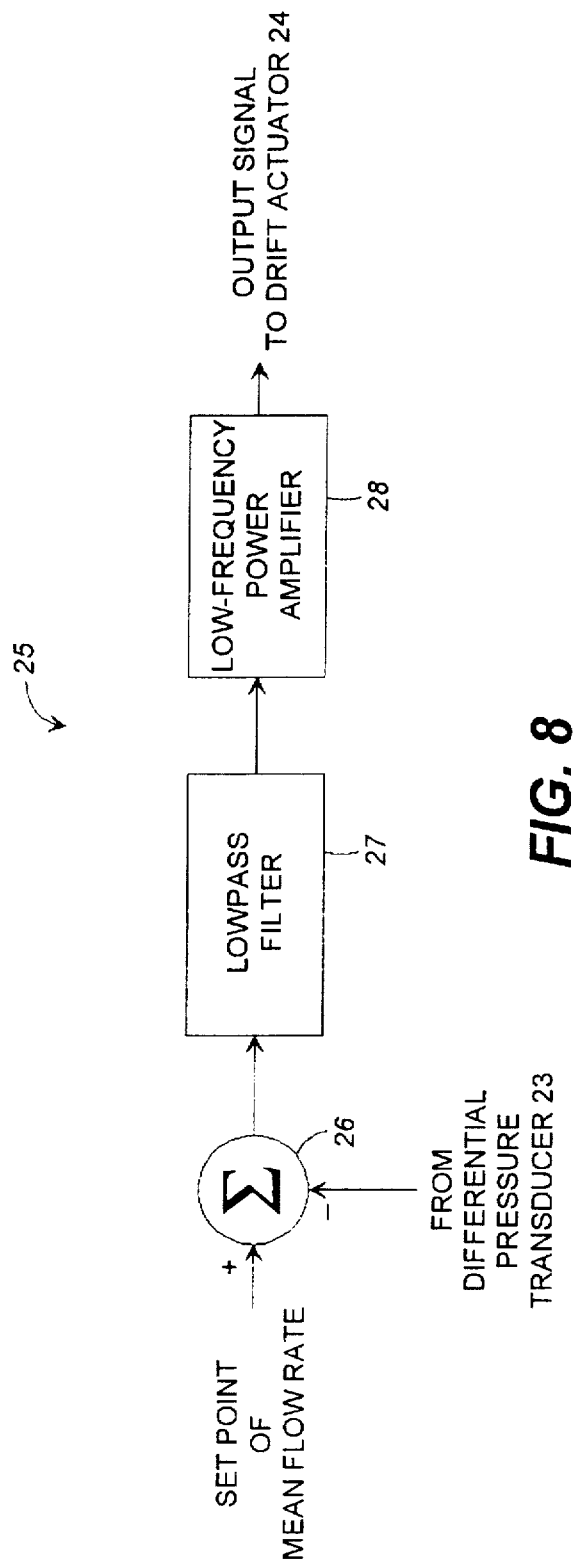
FIG. 8 is a block diagram of a controller for the drift actuator in accordance with this invention.

In FIG. 8, the drift of the magnetostrictive actuator 18 is controlled by the controller 25. The controller 25 includes an adder 26 with an output coupled to a low pass filter 27. As inputs, the adder 26 receives the output signal indicative of the flow rate from the differential pressure transducer 23 that measures the pressure drop across the orifice 14. The adder 26 subtracts the output signal of the differential pressure transducer 23 from a predetermined set point of the mean flow rate, which is set externally to the system 1 of this invention. The adder 26 generates an output signal indicative of the difference between the set point of the mean flow rate and the output signal of the differential pressure transducer 23, and is coupled to provide this output signal to the low pass filter 27. The low pass filter 27 modifies the output signal from the adder 26 thus generating a filtered signal.

Preferably, the low-pass filter 27 has a cut-off frequency of about 5 Hz, for example. A low-frequency power amplifier 28 is coupled to receive the filtered signal from the low-pass filter 27, and amplifies the filtered signal to generate an output signal. The low-frequency power amplifier 28 is coupled to provide its output signal to the drift actuator 24 (see FIG. 7). The drift actuator 24 moves the tube 16 by an amount proportional to or based on the output-signal from the low-frequency power amplifier 28, to control a mean area of the orifice 15. Thus, the controller 25 provides the capability to compensate for drift in the magnetostricitve actuator 18 as well as for heating or other effects that cause drift displacement of the tube 16 relative to the mean position of tapered needle 17. The drift actuator 24 can be a linear actuator using a piezo-ceramic material that contracts or expands, based on the output signal from the low frequency power amplifier 28

Although the subject invention has been described with specific illustrations and embodiments, it will be clear to those of ordinary skill in the art that various modifications may be made therein without departing from the spirit and scope of the invention as outlined in the following claims. For example, although the system 1 of this invention has been described as controlling a combustor system to damp combustion instabilities therein, this invention can be applied to a combustor to further excite combustor (or other process) oscillations by simple modification of the processing performed in FIGS. 6A and 6B, for example, by reversing the terms $[(a_{i,j})^2+(b_{i,j})^2]^{1/2}$ and $[(a_{i-1,j})^2+(b_{i-1,j})^2]^{1/2}$ in the inequality of step S8. Further, this invention can readily be applied to damping or enhancement of oscillations modes in turbo machinery, structures or machines. For these applications, the system's sensor is adapted to sense vibration in the turbo machinery, structure or machine, and to generate a signal indicative of this vibration to the observer. As previously explained in this document, the observer determines the modal functions and frequency for each mode of oscillation in the sensed signal, and the controller generates a control signal with a gain and phase shift, based on the modal functions and frequency for each mode. The actuator induces vibrations in the turbo machinery, structure or machine, based on the control signal generated by the controller. In addition, this invention can also be applied to signal identification in a noisy background, coherent jamming identification and general real time signal identification, due to the capability of this invention to rapidly identify the modal functions (and hence the amplitude and phase) and the frequency of a signal. Further, this invention can be applied to damp or enhance sound in an enclosure. Specifically, a sensor such as a microphone can be placed in an enclosure, and its signal, generated based on sound waves in the enclosure, supplied to the observer of this invention to determine the modal functions and frequencies for each mode of oscillation. Based on the modal functions and frequencies, the controller of this invention generates a control signal with a gain and phase shift, that is supplied to an actuator such as a speaker. By using an appropriate gain and phase shift, the speaker can act to enhance or damp, as desired, sound waves in the enclosure. As will be further understood and appreciated by those possessing ordinary skill in the art, additional modifications, consistent with the concepts and teachings of the invention, may be employed. For example, the invention may be employed in systems utilizing a compressor and having a plenum receiving a fluid. In such a system, the invention may be realized as a method for real time identification of and compensation for a mode of oscillation of the system. To accomplish the inventive aspects, the method uses a sensor to generate a signal f(t). Thereafter, the method operates to determine values of modal functions a(t) and b(t) of the mode of oscillation of the signal f(t), based on a pair of integrals $\int \Psi_a f(t)dt$ and $\int \Psi_b f(t)dt$, respectively, $\Psi_a$ and $\Psi_b$ being predetermined wavelet functions, as previously described, and that are orthogonal and localized at an estimated frequency w of the mode of oscillation. As discussed, the pair of integrals have limits of integration based on a time t and an estimated period $T=2p/\omega$ of the mode of oscillation, wherein the estimated frequency $\omega$ is predetermined initially. The method then determines an updated value of the estimated frequency w, based on the modal functions a(t) and b(t), and updates the wavelet functions $Y_a$ and $Y_b$, based on the updated value of the estimated frequency w. Thereafter, the method generates a control signal to control the oscillation in the system, based on the values of the modal functions a(t) and b(t), the wavelet functions $Y_a$ and $Y_b$, and the updated value of the estimated frequency w. Finally, the method bleeds the fluid from the plenum, based on the control signal. The above applications are intended to be included in the scope and spirit of this invention.

We claim:

1. A method for real time identification of mode of oscillation of a system, the method comprising the steps of:

a) sensing the system to generate a signal f(t);

b) determining values of modal functions a(t) and b(t), based on a pair of integrals $\int \Psi_a f(t)dt$ and $\int \Psi_b f(t)dt$, respectively, $\Psi_a$ and $\Psi_b$ being predetermined wavelet functions that are orthogonal and localized at an estimated frequency $\omega$ of the mode of oscillation and a(t) and b(t) describing the amplitude of oscillations of signal f(t), the pair of integrals having limits of integration based on a time t and an estimated period $T=2\pi/\omega$ of the mode of oscillation, the estimated frequency $\omega$ being predetermined initially;

c) determining an updated value of the estimated frequency $\omega$, $\omega$ being the frequency of the mode of oscillation based on the modal functions a(t) and b(t); and d) updating the wavelet functions $\Psi_a$ and $\Psi_b$, based on the updated value of the estimated frequency $\omega$; evaluating the wavelet functions to identify the modes of oscillation.

2. A method as claimed in claim 1, further comprising the step of:

e) generating a control signal to control the oscillation in the system, based on the values of the modal functions a(t) and b(t), the wavelet functions $\psi_a$ and $\psi_b$, and the updated value of the estimated frequency $\omega$.

3. A method as claimed in claim 2, wherein the system includes a structure, further comprising the step of:

f) vibrating the structure, based on the control signal.

4. A method as claimed in claim 2, wherein the system includes an enclosure, further comprising the step of:

f) generating sound waves in the enclosure, based on the control signal.

5. A method for real time identification of the modes of oscillation of a system, the method comprising the steps of:

a) initializing modal output signals y(t) for L modes of oscillation, wherein L is a predetermined integer;

b) sensing the system and generating a signal indicative of the L modes of oscillation;

c) combining the sensed signal and the modal output signals y(t) of the L modes of oscillation multiplied by respective predetermined weighting functions, to generate L modal input signals f(t);

d) determining modal functions a(t) and b(t) for each of the L modes of oscillation of the sensed signal, based on L pairs of integrals $\int \Psi_a f(t)dt$ and $\int \Psi_b f(t)dt$, respectively, $\Psi_a$ and $\Psi_b$ being predetermined wavelet functions that are orthogonal and localized at an estimated frequency $\omega$ of each of the L modes of oscillation and a(t) and b(t) describing the amplitude of oscillations of signal f(t), the pair of integrals having limits of integration based on a time t and an estimated period $T=2\pi/\omega$ of the mode of oscillation, the estimated frequencies $\omega$ being predetermined initially for each of the L modes of oscillation;

e) determining updated values of the estimated frequencies $\omega$, $\omega$ being the frequency of the mode of oscillation for the L modes of oscillation, based on the modal functions a(t) and b(t); and f) updating the wavelet functions $\Psi_a$ and $\Psi_b$ for the L modes of oscillation, based on respective updated value of the estimated frequencies $\omega$; and evaluating the wavelet functions to identify the modes of oscillation.

6. A method as claimed in claim 5, further comprising the step of:

g) generating a control signal to control the oscillation in the system, based on the values of the modal functions a(t) and b(t), the wavelet functions $\psi_a$ and $\psi_b$ and the updated values of the estimated frequencies $\omega$.

7. A method as claimed in claim 6, wherein the system includes a structure, further comprising the step of:

h) vibrating the structure, based on the control signal.

8. A method as claimed in claim 6, wherein the system includes an enclosure, further comprising the step of:

h) generating sound waves in the enclosure, based on the control signal.

9. A system receiving a signal indicative of a mode of oscillation, the system comprising:

an observer including a processor, coupled to receive the signal, determining values of modal functions a(t) and b(t) of the mode of oscillation of the signal f(t), based on a pair of integrals $\int \psi_a f(t)dt$ and $\int \psi_b f(t)dt$, respectively, $\psi_a$ and $\psi_b$ being predetermined wavelet functions that are orthogonal, localized at an estimated frequency $\omega$ of each of the L modes of oscillation, the pair of integrals having limits of integration based on a time t and an estimated period $T=2\pi/\omega$ of the mode of oscillation, the estimated frequencies $\omega$ being predetermined initially for each of the L modes of oscillation, the observer determining updated values of the estimated frequencies $\omega$ for the L modes of oscillation, based on the modal functions a(t) and b(t), and the observer updating the wavelet functions $\psi_a$ and $\psi_b$ for the L modes of oscillation, based on respective updated values of the estimated frequencies $\omega$.

10. A system as claimed in claim 9, further comprising:

a first controller coupled to receive the values of the modal functions a(t) and b(t) and the frequency $\omega$ determined by the observer, the first controller generating a first control signal based on the modal functions a(t) and b(t), the frequency ω determined by the observer, a gain G and a phase shift φ, and outputting a first control signal.

11. A system for providing real time compensation for a mode of oscillation of a system, the system comprising:

a) sensing means for sensing the system and generating a signal f(t);

b) first determining means responsive to the sensing means for determining values of modal functions a(t) and b(t) of a mode of oscillation of the signal f(t), the modal functions a(t) and b(t) being based on a pair of integrals $\int \Psi_a f(t)dt$ and $\int \Psi_b f(t)dt$, respectively, wherein $\Psi_a$ and $\Psi_b$ are predetermined wavelet functions that are orthogonal and localized at an estimated frequency ω of the mode of oscillation and a(t) and b(t) describing the amplitude of oscillations of signal f(t), the pair of integrals having limits of integration based on a time t and an estimated period T=2π/ω of the mode of oscillation, the estimated frequency ω being predetermined initially;

c) second determining means for determining an updated value of the estimated frequency ω, based on the modal functions a(t) and b(t);

d) updating means responsive to the estimated frequency ω, ω being the frequency of the mode of oscillation for updating the wavelet functions $\Psi_a$ and $\Psi_b$, based on the updated value of the estimated frequency ω; and e) compensating means responsive to the wavelet functions $\Psi_a$ and $\Psi_b$ for compensating the system based upon the updated wavelet functions $\Psi_a$ and $\Psi_b$.

* * * * *

UNITED STATES PATENT AND TRADEMARK OFFICE
CERTIFICATE OF CORRECTION

PATENT NO. : 5,784,300
DATED : July 21, 1998
INVENTOR(S) : Neumeier et al.

It is certified that error appears in the above-identified patent and that said Letters Patent is hereby corrected as shown below:

In The Drawings:

FIG. 5A, at block S16, delete "i=$N_{MAY}$?", and insert --i=$N_{MAX}$?--.

FIG. 6A, at block S106, delete "$[(a_{i,j}) + (b_{i,j})^2]^{1/2} >$", and insert --$[(a_{i,j})^2 + (b_{i,j})^2]^{1/2} >$--.

Figure 6B:
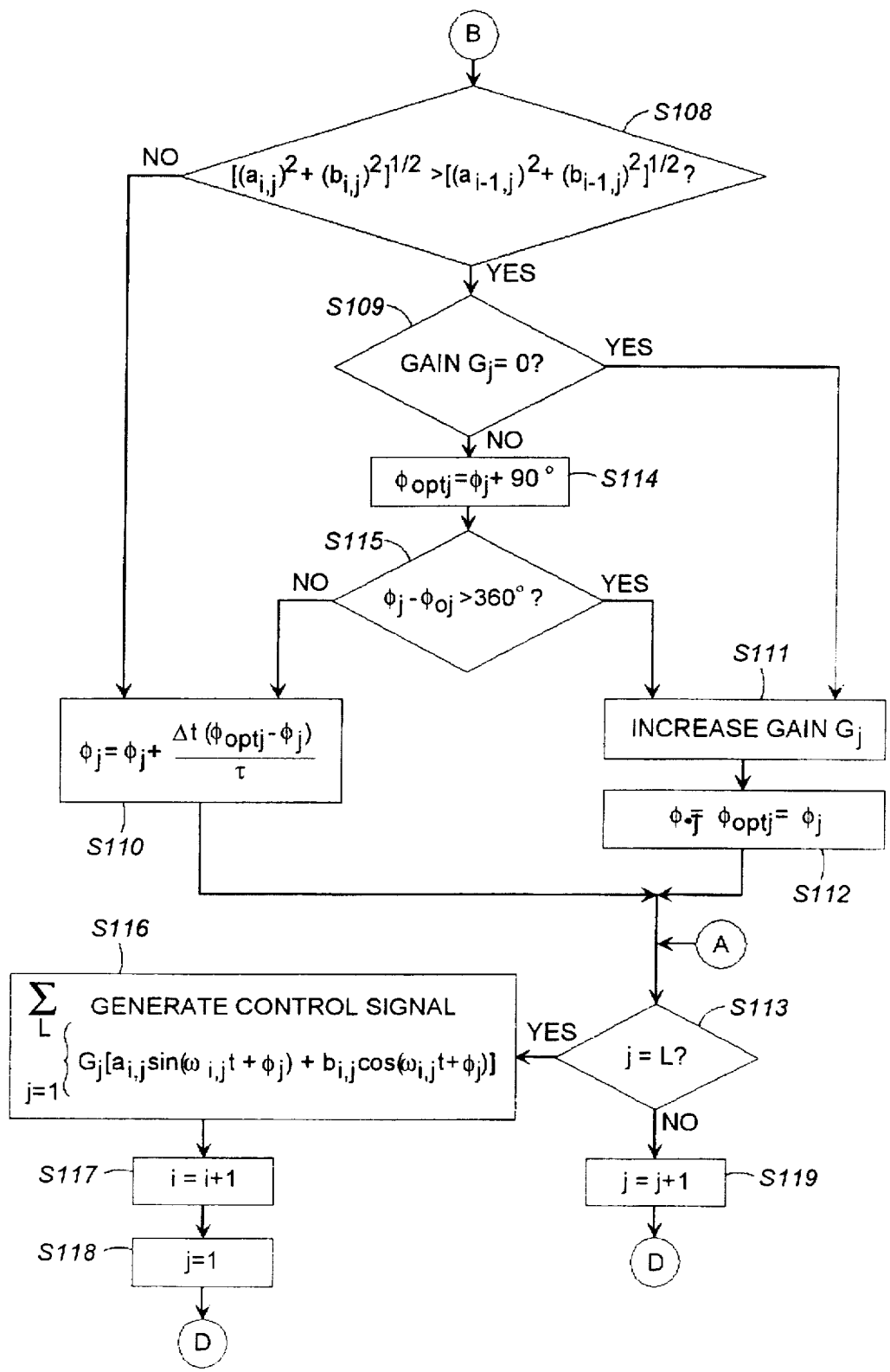

FIG. 6B, at block S112, delete "$\phi_{\bullet j}$", and insert --$\phi_{oj}$--.

Column 7, line 28, after "that is,", delete "$\omega \; \Omega$", and insert --$\omega \neq \Omega$--.

Column 7, line 59, delete ".", and insert --:--.

Column 11, line 8, delete "$y_j a_j \sin(\omega_j t) + b_j \cos(\omega_j t)$", and insert -- $y_j = a_j \sin(\omega_j t) + b_j \cos(\omega_j t)$--.

Column 11, line 29, after "such", delete "15".

Column 11, line 34, after "can be", delete "20".

Column 12, line 36, delete "S22", and insert --S27--.

UNITED STATES PATENT AND TRADEMARK OFFICE
CERTIFICATE OF CORRECTION

PATENT NO. : 5,784,300
DATED : July 21, 1998
INVENTOR(S) : Neumeier et al.

It is certified that error appears in the above-identified patent and that said Letters Patent is hereby corrected as shown below:

Column 13, line 36, delete "S6", and insert - -S106- -.

Column 14, line 45, delete "S18", and insert - -S118- -.

Column 16, line 33, delete "S8", and insert - -S108- -.

Signed and Sealed this

Fifteenth Day of December, 1998

Attest:

BRUCE LEHMAN

Attesting Officer

Commissioner of Patents and Trademarks